(No Model.)
S. M. N. ROGERS.
FIRE KINDLER.
No. 488,223. Patented Dec. 20, 1892.
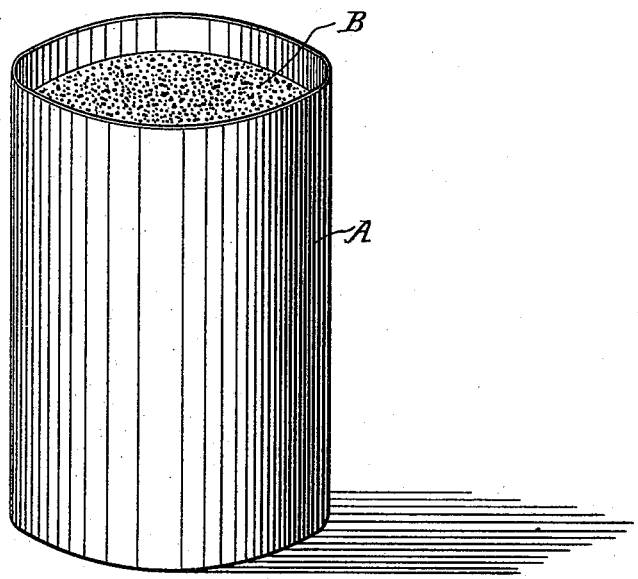
Witnesses
Walter Allen,
J. M. Mister
Inventor
Silas M. N. Rogers
By his Attorney
Herbert W. T. Jenner
atty
THE NORRIS PETERS CO., PHOTO-LITHO., WASHINGTON, D. C.

UNITED STATES PATENT OFFICE.

SILAS M. N. ROGERS, OF BELL'S, TEXAS.

FIRE-KINDLER.

SPECIFICATION forming part of Letters Patent No. 488,223, dated December 20, 1892.

Application filed May 13, 1892. Serial No. 432,828. (No model.)

*To all whom it may concern:*

Be it known that I, SILAS M. N. ROGERS, a citizen of the United States, residing at Bell's, in the county of Grayson and State of Texas, have invented certain new and useful Improvements in Fire-Kindlers; and I do hereby declare the following to be a full, clear, and exact description of the invention, such as will enable others skilled in the art to which it appertains to make and use the same.

This invention relates to fire-kindlers; and it consists of a novel composition of ingredients as hereinafter fully described and claimed.

The drawing shows a perspective view of a can containing the composition.

In forming the composition equal parts of finely pulverized inflammable carbon and finely sifted wood-ashes are first mixed together, and are then wet with a sufficient quantity of mineral oil and worked over and kneaded until they will absorb no more oil. The composition is then in the form of a wet and plastic paste and is put up in tins for sale.

A is the tin, and B is the composition in the tin. The inflammable carbon consists of charcoal, or a mixture of equal parts of charcoal and pulverized anthracite. When a spoonfull of the mixture is taken out of the tin and placed on and among green wood in a fire-place or stove, and ignited with a match, it will cause the green wood to burn freely.

The composition is non-explosive, and although highly inflammable will not burn so rapidly as to fail to ignite the green wood.

The wood ashes serve as a sort of wick for holding the oil and preventing it from being affected by the dampness of the green wood. The burning oil ignites the inflammable mixture of charcoal and anthracite which gives out great heat and dries up the dampness of the green wood. The wet is driven out of the interior of the wood and evaporated by the heat of the burning carbon, so that the wood soon begins to burn freely.

I am aware that prior to my invention, artificial fuel has been made by treating solid matter such as coal dust and many other sorts of material which are of little use as fuel from being very hard to burn, with various inflammable oils, resins and fats which burn easily, and forming the mixture into blocks or pieces for convenient size for use.

What I claim is:

Fire-kindling, consisting of a wet paste formed of equal parts of pulverized charcoal and wood-ashes mixed with mineral oil, substantially as set forth.

In testimony whereof I affix my signature in presence of two witnesses.

SILAS M. N. ROGERS.

Witnesses:
J. A. HARDAWAY,
D. B. MITCHELL.